(12) United States Patent
Tang et al.

(10) Patent No.: US 11,837,020 B2
(45) Date of Patent: Dec. 5, 2023

(54) EXPRESSION REALIZATION METHOD AND DEVICE FOR VIRTUAL CHARACTER, AND STORAGE MEDIUM

(71) Applicant: NETEASE (HANGZHOU) NETWORK CO., LTD., Zhejiang (CN)

(72) Inventors: Yida Tang, Zhejiang (CN); Zhi Xiong, Zhejiang (CN)

(73) Assignee: NETEASE (HANGZHOU) NETWORK CO., LTD., Zheijiang ( * ) Notice: Subject to any disclaimer, the term of this patent is extended or adjusted under 35 U.S.C. 154(b) by 111 days.

(21) Appl. No.: 17/607,093

(22) PCT Filed: Apr. 7, 2020

(86) PCT No.: PCT/CN2020/083556
§ 371 (c)(1),
(2) Date: Oct. 28, 2021

(87) PCT Pub. No.: WO2020/233253
PCT Pub. Date: Nov. 26, 2020

(65) Prior Publication Data
US 2022/0230472 A1 Jul. 21, 2022

(30) Foreign Application Priority Data
May 17, 2019 (CN) .......................... 201910410287.8

(51) Int. Cl.
*G06T 13/40* (2011.01)
*G06V 40/16* (2022.01)
(52) U.S. Cl.
CPC .......... *G06V 40/176* (2022.01); *G06V 40/164* (2022.01); *G06V 40/171* (2022.01)
(58) Field of Classification Search
None
See application file for complete search history.

(56) References Cited

U.S. PATENT DOCUMENTS 5,774,357 A * 6/1998 Hoffberg ................ H04N 7/163
 712/240
9,430,869 B1 * 8/2016 Kilpatrick ................ G06T 9/00
(Continued)

FOREIGN PATENT DOCUMENTS

| CN | 1920880 A | 2/2007 |
| CN | 101311966 A | 11/2008 |

(Continued)

OTHER PUBLICATIONS

The International Search Report dated Jul. 8, 2020 for PCT patent application No. PCT/CN2020/083556.
(Continued)

*Primary Examiner* — Soo Shin
(74) *Attorney, Agent, or Firm* — Qinghong Xu

(57) ABSTRACT

Provided are an expression realization method and device for virtual character, and a storage medium, the method comprising: acquiring sequence frames of respective parts of a face of the virtual character, wherein the sequence frames of respective parts contain part sequences corresponding to respective expressions; acquiring a first part sequence corresponding to a first expression and a second part sequence corresponding to a second expression from the sequence frames of respective parts, wherein the first part sequence comprises a first transition part sequence, and the second part sequence comprises a second transition part sequence; and successively playing the first part sequence and the second part sequence according to a first preset instruction, wherein a playing of the first transition part sequence is located at a tail of the playing of the first part sequence, and a playing of the second transition part sequence is located at a head of the playing of the second part sequence.

19 Claims, 17 Drawing Sheets

(56) References Cited

U.S. PATENT DOCUMENTS

| | | | | |
|---|---|---|---|---|
| 10,860,838 | B1* | 12/2020 | Elahie | A63F 13/655 |
| 11,638,869 | B2* | 5/2023 | Gotoh | A63F 13/55 |
| | | | | 463/36 |
| 2018/0027307 | A1* | 1/2018 | Ni | H04N 21/44218 |
| | | | | 345/419 |
| 2019/0005309 | A1* | 1/2019 | Hyun | G06F 3/012 |
| 2022/0230472 | A1* | 7/2022 | Tang | G06V 40/164 |

FOREIGN PATENT DOCUMENTS

| | | | |
|---|---|---|---|
| CN | 104217455 | A | 12/2014 |
| CN | 104318602 | A | 1/2015 |
| CN | 104599309 | A | 5/2015 |
| CN | 106919906 | A | 7/2017 |
| CN | 108305309 | A | 7/2018 |
| CN | 109272566 | A | 1/2019 |
| CN | 109711362 | A | 5/2019 |
| CN | 110116413 | A | 8/2019 |
| CN | 110136231 | A | 8/2019 |
| WO | 2018128996 | A1 | 7/2018 |

OTHER PUBLICATIONS

The 1st Office Action dated Dec. 30, 2019 for CN patent application No. 201910410287.8.
Notice of Allowance dated Jan. 5, 2023 of Chinese Application No. 201910410287.8.

* cited by examiner

Expression Setting Interface 201

| Expression List 202 | Part Mapping Selection 203 |
|---|---|
| Expression 1 | Eyebrow-Part No.    2XX ▼ |
| Expression 2 | Eye-Part No.    0XX ▼ |
| Expression 3 | Mouth- Part No.    1XX ▼ |
| . | |
| . | |
| . | |
| Expression n | |

Fig.2

Expression Setting Interface 301

| Expression List 302 | Part List 303 | Part Mapping Selection Bar 304 | |
|---|---|---|---|
| Expression 1 | Eyebrow | KeyFrame0-Part No. | 010 ▼ |
| Expression 2 | Eye | KeyFrame0-Number of Continuous Frames | 2 |
| Expression 3 | Mouth | KeyFrame1-Part No. | 011 ▼ |
| . | | KeyFrame1-Number of Continuous Frames | 2 |
| . | | KeyFrame2-Part No. | 001 ▼ |
| Expression n | | KeyFrame2-Number of Continuous Frames | 2 |

Fig.3

Expression Setting Interface 401

Expression List 402

Expression 1

Expression 2

Expression 3

·
·
·

Expression n

Transition Part Sequence Configuration Bar 403

Transition Eyebrow-Part No.   2XX ▼

Transition Eye-Part No.   0XX ▼

Transition Mouth-Part No.   1XX ▼

Fig.4

Expression Setting Interface 501

| Expression List 502 | Part List 503 | Part Mapping Selection Bar 504 | |
|---|---|---|---|
| Expression 1 | Transition Eyebrow | KeyFrame0-Part No. | 010 ▼ |
| Expression 2 | Transition Eye | KeyFrame0-Number of Continuous Frames | 2 |
| Expression 3 | Transition Mouth | KeyFrame1-Part No. | 011 ▼ |
| . | | KeyFrame1-Number of Continuous Frames | 2 |
| . | | KeyFrame2-Part No. | 001 ▼ |
| . | | | |
| Expression n | | KeyFrame2-Number of Continuous Frames | 2 |

Fig.5

EXPRESSION REALIZATION METHOD AND DEVICE FOR VIRTUAL CHARACTER, AND STORAGE MEDIUM

CROSS-REFERENCE TO RELATED APPLICATIONS

This application is the 371 application of PCT Application No. PCT/CN2020/083556, filed on Apr. 7, 2020, which claims priority to Chinese Patent Application No. 201910410287.8, filed on May 17, 2019, the entireties of which are incorporated by reference for all purpose.

TECHNICAL FIELD

The embodiments of the present disclosure relate to the field of image processing technology, and in particular to a method, an apparatus and a storage medium for realizing an expression of a virtual character.

BACKGROUND

The field of a virtual human is a relatively new field, which uses computer graphics and image technology and anatomical knowledge to establish a three-dimensional geometric model similar to a human. The virtual human may have appearance, body shape, bones, and organ models of the human. The virtual human can also play a role to communicate with humans, and can also simulate facial expressions, body movements, etc. of the human. The virtual human includes many aspects of technology, such as action transfer, expression transfer, expression realization, etc.

In interactive media, such as electronic games and human-computer interaction software, there are roughly three commonly used expression realization mays. The first way is to bind bones to a 3D model of the virtual human through a skeletal animation technology, and use bone motion to drive a face of the 3D model of the virtual human to realize an expression animation. The second way is to stretch a mapping of a specific face region the of the virtual human through a mapping stretching technology, such as stretching an eyelid UV may simulate the effect of blinking, stretching a mouth UV may simulate opening and closing of the mouth, in order to achieve a simple basic expression. The third way is to carefully layer and dismantle by using of stereoscopic plotting materials of a plane and do some displacements, scaling and deformations to achieve animation effects, which can be understood as the skeletal animation on the plane.

The first two ways mentioned above are expression realization methods based on 3D. These methods strongly depend on the numbers of faces and bones in a five sense organs model of the virtual human. It has a large amount of resources and thus has high consumption, which is only suitable for a terminal having fewer characters on the same screen and higher hardware configuration. The third way is an expression realization method based on 2D. Although it solves the problem of the high consumption to a certain extent, it needs to replace a whole face. The generation and switching of the expression are prone to jams, especially when switching between expressions. It is easy to get stuck and has problems, such as unnatural switching, etc.

It should be noted that the information disclosed in the background section above is only used to enhance the understanding of the background of the present disclosure, and therefore may include information that does not constitute the prior art known to those skilled in the art.

SUMMARY

The present disclosure provides a method, an apparatus and a storage medium for realizing an expression of a virtual character, which solves the problems that existing expression generation and switching are prone to jams, which make the switching of the expressions unnatural.

According to a first aspect of the present disclosure, there is provided a method for realizing an expression of a virtual character, the method includes: acquiring sequence frames of respective parts of a face of the virtual character, wherein the sequence frames of respective parts contain part sequences corresponding to respective expressions; acquiring a first part sequence corresponding to a first expression and a second part sequence corresponding to a second expression from the sequence frames of respective parts, wherein the first part sequence comprises a first transition part sequence, and the second part sequence comprises a second transition part sequence; and successively playing the first part sequence and the second part sequence according to a first preset instruction, wherein a playing of the first transition part sequence is located at a tail of the playing of the first part sequence, and a playing of the second transition part sequence is located at a head of the playing of the second part sequence.

According to a second aspect of the present disclosure, there is provided an apparatus for realizing an expression of a virtual character, the apparatus includes: an acquisition module configured to acquire sequence frames of respective parts of a face of the virtual character, wherein each of the sequence frames of respective parts contains part sequences corresponding to respective expressions, and the acquisition module is further configured to acquire a first part sequence corresponding to a first expression and a second part sequence corresponding to a second expression from the sequence frames of respective parts, wherein the first part sequence comprises a first transition part sequence, and the second part sequence comprises a second transition part sequence; and a processing module configured to successively play the first part sequence and the second part sequence according to a first preset instruction, and a playing of the first transition part sequence is located at a tail of the playing of the first part sequence, and a playing of the second transition part sequence is located at a head of the playing of the second part sequence.

According to a third aspect of the present disclosure, there is provided a device for realizing an expression of a virtual character, the device includes: a memory; a processor; and a computer program; wherein the computer program is stored in the memory, and is configured to implement the method according to the first aspect of the present disclosure.

According to a fourth aspect of the present disclosure, there is provided a computer-readable storage medium having a computer instruction stored thereon, wherein the computer instruction is executed by a processor to implement the method according to the first aspect of the present disclosure.

It should be understood that the above general description and the following detailed description are merely exemplary and explanatory, and should not limit the present disclosure.

BRIEF DESCRIPTION OF THE DRAWINGS

In order to more clearly explain the technical solutions in the embodiments of the present disclosure or the prior art, the following will briefly introduce the drawings that need to be used in the description of the embodiments or the prior art. Obviously, the drawings in the following description are some embodiments of the present disclosure. For those of ordinary skill in the art, other drawings can be obtained based on these drawings without creative labor.

FIG. 2 is a schematic diagram of an expression setting interface provided by some embodiments of the present disclosure;

FIG. 3 is a schematic diagram of an expression setting interface provided by some embodiments of the present disclosure;

FIG. 4 is a schematic diagram of an expression setting interface provided by some embodiments of the present disclosure;

FIG. 5 is a schematic diagram of an expression setting interface provided by some embodiments of the present disclosure;

DETAILED DESCRIPTION

Figure 1:
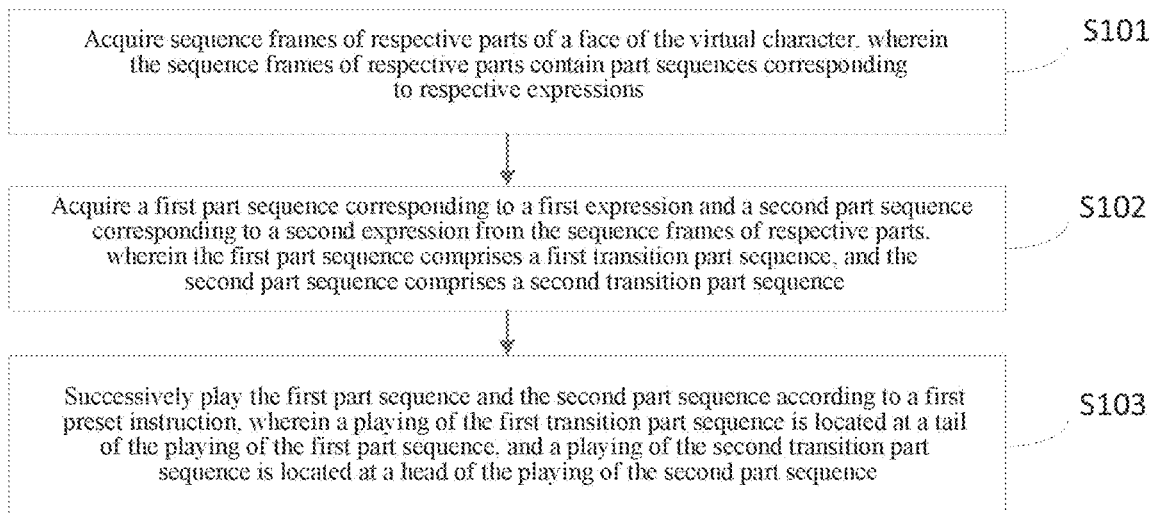
FIG. 1 is a schematic flowchart of a method for realizing an expression of a virtual character provided by some embodiments of the present disclosure.

In order to make the objectives, technical solutions and advantages of the embodiments of the present disclosure clearer, the technical solutions in the embodiments of the present disclosure will be described clearly and completely in conjunction with the accompanying drawings in the embodiments of the present disclosure. Obviously, the described embodiments are parts of the embodiments of the present disclosure, but not all the embodiments. Based on the embodiments in the present disclosure, all other embodiments obtained by those of ordinary skill in the art without creative work fall within the protection scope of the present disclosure.

It should be understood that the terms "including" and "having" and any variations of them used herein are intended to cover non-exclusive inclusion. For example, a process, method, system, product, or device that includes a series of steps or units need not be limited to those clearly listed steps or units, but may include other steps or units that are not clearly listed or are inherent to these processes, methods, products, or device.

In the current interactive media, the expression of virtual characters is realized based on two methods. One is to realize an expression animation based on 3D means. This realization method strongly depends on the number of faces and the number of bones in a five sense organs model of the virtual character. It has a large amount of resources and thus has high consumption, so it is only suitable for an operating environment having fewer characters on the same screen and higher hardware configuration. The other method is to realize an expression animation based on 2D means. When switching between different expressions in this method, an entire facial mapping needs to be replaced, and the expression animation effect is realized through displacements, scalings and deformations. Therefore, the number of pictures that need the entire facial mapping is also large and the memory space occupied is large, when achieving a smooth, fine and natural transition expression effect.

In order to solve the problem that the existing expression animation is not smooth when the expression is switched, embodiments of the present disclosure provide a method for realizing an expression of a virtual character. The method realizes a natural transition between a first expression and a second expression of the virtual character by the followings steps: acquiring sequence frames of respective parts of a face of the virtual character; acquiring a first part sequence corresponding to a first expression and a second part sequence corresponding to a second expression from the sequence frames of respective parts, wherein the first part sequence includes a first transition part sequence, and the second part sequence includes a second transition part sequence; and successively playing the first part sequence and the second part sequence according to a first preset instruction, and the playing of the first transition part sequence is located at the tail of the playing of the first part sequence, and the playing of the second transition part sequence is located at the head of the playing of the second part sequence.

The technical solutions of the present disclosure are described in detail below with specific embodiments. The following specific embodiments can be combined with each other, and the same or similar concepts or processes may not be repeated in some embodiments.

FIG. 1 is a schematic flowchart of a method for realizing an expression of a virtual character provided by some embodiments of the present disclosure. As shown in FIG. 1, the method provided in this embodiment includes the following steps.

At S101, sequence frames of respective parts of a face of the virtual character are acquired, wherein the sequence frames of respective parts contain part sequences corresponding to respective expressions.

In this embodiment, the sequence frame of a certain part refers to a set composed of all frames related to said part of the face. Each part corresponds to a sequence frame, and each sequence frame contains frames for different expressions. A set composed of frames corresponding to one of different expressions of a part is called as a part sequence corresponding to said expression. It can also be considered that the sequence frames of respective parts respectively contain part mappings corresponding to the different expressions of said part, and the part mappings corresponding to the different expressions of respective parts are combined to get part sequences corresponding to respective expressions of respective parts. It should be noted that, in the sequence frame, the positions of the part mappings in the part sequence are not necessarily successive. The part sequence can be combined by multiple part mappings at any positions in the sequence frames, as long as all these part mappings are related to the specified part.

For example, for the eye part of the face of the virtual character, the sequence frame of the eye part includes corresponding mappings of the eye part in different expression states, that is, the part mappings, and part mappings of one or more eye parts are combined into the part sequence of the eye part corresponding to a certain expression.

For example, the parts of the face of the virtual character in this embodiment include: a facial base map, five sense organs such as eyebrows, eyes, nose, and mouth, and an additional layer. It should be noted that the facial base map refers to an image with facial parts such as eyes, eyebrows, mouth, etc. removed and only including basic skin color of the character's face, hair projection information, etc. The additional layer refers to a facial additional layer about such as tears, flushes, and moles.

In the realization of expressions based on 2D means, multiple whole facial mappings (including the facial base map as well as the facial features about the five sense organs) are needed to generate animations, and the main changes in the expression animations are actually the five sense organs, while the facial features other than the five sense organs are almost unchanged, so the method of replacing the entire facial mapping produces a large number of repeated regions, which leads to a waste of resources. In the method of realizing the expression of the virtual character provided in this embodiment, the facial base map is separated from the entire facial mapping, and the same facial base map is reused in different expressions, thereby avoiding the waste of resources.

It should be noted that the part mappings of respective parts in this embodiment are obtained through a preset sampling method. For example, a full-face sampling is used for the facial base map, a half-face sampling is used for the additional layer, and a one-third sampling is used for the remaining parts. Through the above preset sampling method, the compression ratio of the part mapping is reduced, which greatly improves the accuracy of the facial features of the virtual character.

At S102, a first part sequence corresponding to a first expression and a second part sequence corresponding to a second expression are acquired from the sequence frames of respective parts, wherein the first part sequence includes a first transition part sequence, and the second part sequence includes a second transition part sequence.

It can be understood that the first transition part sequence is a transition part sequence corresponding to the first expression, and is included in the first part sequence. The second transition part sequence is a transition part sequence corresponding to the second expression, and is included in the second part sequence. The first transition part sequence can be a transition part sequence corresponding to the switching of the first expression into the second expression, and also can be a transition part sequence corresponding to the switching of the first expression into any other expression, or a transition part sequence corresponding to the switching of other expressions switching into the first expression. The second transition part sequence can be a transition part sequence corresponding to the switching of the second expression into the first expression, and also can be a transition part sequence corresponding to the switching of the second expression into any other expression, or a transition part sequence corresponding to the switching of other expressions into the second expression.

In this embodiment, the part mappings in the sequence frame of respective parts should be numbered in advance, and different types of part mappings are assigned a different type of part number. For example, different parts are distinguished by numbers with different initial digital to determine a sampling range. The numbering of part is used by the program to identify the type of part and specific part mappings under that type of part. For example, the part number (No.) of the facial base map can be set to 499, the part number (No.) of the eve can be a three-digit number starting with 0, such as 0XX, the part number (No.) of the mouth is 1XX, the part number (No.) of the eyebrow is 2XX, and the part number (No.) of the additional layer is 3XX. For a character model, the facial base map of 499 is unique.

For different expressions, the part numbers (Nos.) of respective parts corresponding to an operation of the user are read according to the user' operation on an expression setting interface, and respective part mappings corresponding to a certain expression are acquired from the sequence frames of respective parts, according to the part numbers (Nos.) of respective parts.

In a possible design way, the first part sequence corresponding to the first expression includes a frame of part mappings of respective parts of the face of the virtual character, and the user respectively sets the part mappings of respective parts under the first expression through the expression setting interface. FIG. 2 is a schematic diagram of an expression setting interface provided by some embodiments of the present disclosure. As shown in FIG. 2, the expression setting interface 201 includes an expression list 202 and a part mapping selection bar 203. The expression list 202 includes expressions 1, 2, 3 . . . , and n. The part mapping selection bar 203 includes a mapping selection control for the five sense organs such as eyebrows, eyes, and mouth. Of course, the part mapping selection control for more parts can be expanded to enrich the facial features of the virtual character. The user sets the part mappings of an expression 1 through the expression setting interface 201 shown in FIG. 2. Furthermore, the user selects part numbers (Nos.) of the part mappings of respective parts corresponding to the expression 1 in the part mappings selection bar 203 through a pull-down menu. The program recognizes the part numbers (Nos.) of respective parts and obtains part mappings corresponding to the expression 1 from the sequence frames of respective parts. The expression 1 in FIG. 2 refers to one frame of expression, that is, a static expression. Therefore, only the part numbers (Nos.) of the part mappings about one frame of eyebrows, eyes, and mouth need to be set.

In another possible design way, the first part sequence corresponding to the first expression includes multiple frames of the part mappings for respective parts of the face of the virtual character, and the user sets the part mappings of respective parts in a plurality of key frames, respectively, through the expression setting interface. FIG. 3 is a schematic diagram of an expression setting interface provided by some embodiments of the present disclosure. As shown in FIG. 3, the expression setting interface 301 includes an expression list 302, a part list 303, and a part mapping selection bar 304. The expression list 302 includes expressions 1, 2, 3 . . . , and n, the part list 303 includes eyebrows, eyes, and mouth, and the part mapping selection bar 304 includes a mapping selection control and a setting control. The mapping selection control is used to control selections for the mappings of the part in the plurality of key frames, and the setting control is used to control the number of continuous frames for respective key frame. The user sets the part mappings of the eye part in the expression 1 through the expression setting interface 301 shown in FIG. 3. For example, the user selects, in the part mapping selection bar 304, the part numbers (Nos.) of the part mappings of the eye part in key frames 0, 1, 2 through the pull-down menu. At the same time, the user sets the number of continuous frames of the part mappings for respective key frames.

Through the above-mentioned expression setting process of the user, the part numbers (Nos.) of respective parts in the part sequences corresponding to different expressions is stored in a resource library, so as to obtain the part sequences corresponding to different expressions from the sequence frame of the resource library, according to the part number (No.).

In this embodiment, more transition part sequences can be set according to actual needs and can be used for natural transitions between different expressions. Exemplarily, a third transition part sequence and a fourth transition part sequence can be set, the third transition part sequence is used to a switching from the first expression to the third expression, and the fourth transition part sequence is used to a switching from the third expression to the first expression.

In some embodiments, the first transition part sequence for switching the first expression to the second expression and the second transition part sequence for switching the second expression to the first expression may be the same part sequence or different part sequences. The embodiments in the present disclosure do not specifically limit this.

In this embodiment, the transition part sequence may include part sequences of all parts in the face of the virtual character. Optionally, the transition part sequence includes part sequences of a part of parts in the face of the virtual character.

In some embodiments, the transition part sequence includes one or more frames of part mappings of respective parts of the face of the virtual character. The setting process of the transition part sequence mentioned above will be described below in conjunction with FIG. 4 and FIG. 5. FIG. 4 is a schematic diagram of an expression setting interface provided by some embodiments of the present disclosure, and FIG. 5 is a schematic diagram of an expression setting interface provided by other embodiments of the present disclosure.

In a possible design way, the user sets a transition part sequence for each expression through the expression setting interface 401 shown in FIG. 4. The expression setting interface 401 includes an expression list 402 and a transition part sequence configuration bar 403. The transition part sequence configuration bar 403 includes a mapping selection control for respective part of the virtual character's face, such as a mapping selection control for transition eyebrows, a mapping selection control for transition eyes, and a mapping selection control for transition mouth. The user can select the part mappings of respective parts from the resource library through the pull-down menu, or draw a new part mapping.

In another possible design way, the user sets a transition part sequence for each expression through the expression setting interface 501 shown in FIG. 5. The expression setting interface 501 includes an expression list 502, a part list 503, and a part mapping selection bar 504. The part mapping selection bar 504 includes a mapping selection control and a setting control. The mapping selection control is used to control selections for the mapping of a certain part in the transition part sequence, in a plurality of key frames, and the setting control is used to control the number of continuous frames of each key frame. The user sets the part mappings of the transition eye in the plurality of key frames under the expression 1 through the expression setting interface 501 shown in FIG. 5. For example, the user selects the part numbers (Nos.) of the transition eye corresponding to the expression 1 in the plurality of key frames through the pull-down menu in the part mappings selection bar 504. It can be understood that the total numbers of continuous frames of the part mappings of respective parts are the same. For example, the number of part mappings of the transition eyebrow is 3, each mapping lasts 2 frames, and the total number of continuous frames is 6 frames. Correspondingly, for the transition eyes and the transition mouth, the total numbers of continuous frames are both 6 frames, too. For the transition eyes and the transition mouth, the minimum numbers of part mappings are 1, and in this case, each mapping lasts 6 frames, and the maximum numbers of part mapping is 6, and in this case, each mapping lasts 1 frame.

According to the user's selection operation on the expression setting interface, the first transition part sequence corresponding to the switching from the first expression to the second expression is determined. The first transition part sequence is stored in the resource library, and at the same time a first part sequence identifier corresponding to the first expression and a first transition part sequence identifier are stored in an expression transition table. Similarly, according to the user's selection operation on the expression setting interface, the second transition part sequence corresponding to the switching from the second expression to the first expression is determined. The second transition part sequence is stored in the resource library, and at the same time a second part sequence identifier corresponding to the second expression and a second transition part sequence identifier are stored in the expression transition table.

In this embodiment, by presetting the transition part sequence for each expression, a natural transition between different expressions is realized, and the fluency of expression switching of the virtual character is improved. It should be noted that the switching of different expressions can reuse the transition part sequences stored in the resource library, and the transition part sequences are already been made. If the existing transition part sequence is not suitable, a new transition part sequence can be rebuilt according to the above expression setting interface.

At S103, the first part sequence and the second part sequence are successively played according to a first preset instruction.

In this embodiment, the first preset instruction is used to instruct the execution of switching of the first expression to the second expression.

In response to that the first transition part sequence and the second transition part sequence only include one frame of part mappings for respective parts of the virtual character's face, when switching from the first expression to the second expression, the expressions are played in the following order: the first part sequence corresponding to the first expression→the first transition part sequence→the second transition part sequence→the second part sequence corresponding to the second expression.

Figure 6:
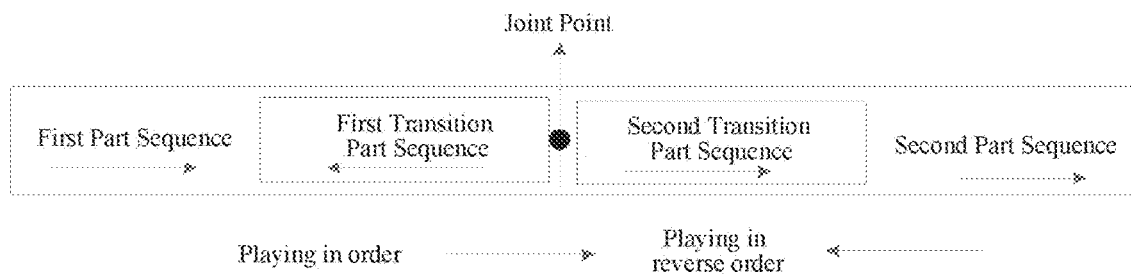
FIG. 6 is a schematic diagram of playing an expression switching provided by some embodiments of the present disclosure.

In response to that the first transition part sequence and the second transition part sequence include a plurality of frames of part mappings for respective parts of the virtual character's face, when switching from the first expression to the second expression, after the first part sequence is played, frames in the first transition part sequence is played in reverse order, and then the second transition part sequence and the second part sequence are played in order, as shown in FIG. 6. In some embodiments, take the first part sequence corresponding to the first expression as an example, part mappings of respective parts in every frame picture are selected from the sequence frames of respective parts in the resource library, first frame pictures in the first part sequences corresponding to the first expression are combined, the combined pictures of every frame are played frame by frame according to a preset playing order, so as to generate the first expression. Similarly, the second expression and the transition expression between the first expression and the second expression can be generated separately.

It should be noted that, for the various parts of the virtual character's face, such as the eve part, a closed-eye frame is generally used as a joint point shown in FIG. 6, and try to ensure that the closed-eye frames in all blinking segments do not have too much difference, otherwise the transition effect of the expressions is poor. For example, for the mouth part, a normal frame of the current expression is generally selected. Of course, in actual applications, it is necessary to determine whether to reselect or make a transition mouth according to the amplitude of the mouth.

The methods according to some embodiments of the present disclosure realize a natural transition between different expressions the virtual character and an improvement of the naturalness and fluency of the expression switching of the virtual character by the followings steps: acquiring sequence frames of respective parts of a face of the virtual character; acquiring a first part sequence corresponding to a first expression and a second part sequence corresponding to a second expression from the sequence frames of respective parts, wherein the first part sequence includes a first transition part sequence, and the second part sequence includes a second transition part sequence; and successively playing the first part sequence and the second part sequence according to a first preset instruction, and the playing order of the first transition part sequence is located at the tail of the playing of the first part sequence, and the playing order of the second transition part sequence is located at the head of the playing of the second part sequence.

The foregoing embodiments show the switching process from the first expression to the second expression. Since a transition part sequence is added between the first expression and the second expression, a natural transition from the first expression to the second expression is realized. Correspondingly, the following embodiments show the switching process from the second expression to the first expression. Since a transition part sequence is added between the second expression and the first expression, a natural transition from the second expression to the first expression is realized.

Figure 7:
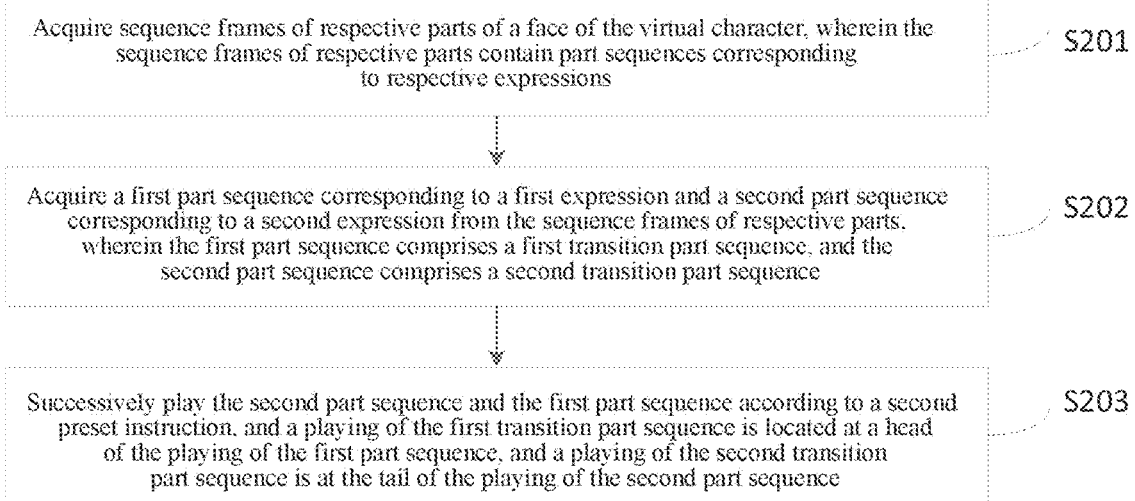
FIG. 7 is a schematic flowchart of a method for realizing an expression of a virtual character according to some embodiments of the present disclosure.

FIG. 7 is a schematic flowchart of a method for realizing an expression of a virtual character provided by some embodiments of the present disclosure. As shown in FIG. 7, the method includes the following steps.

At S201, sequence frames of respective parts of a face of a virtual character are acquired, wherein the sequence frames of respective parts contain part sequences corresponding to respective expressions.

At S202, a first part sequence corresponding to a first expression and a second part sequence corresponding to a second expression are acquired from the sequence frames of respective parts, wherein the first part sequence includes a first transition part sequence, and the second part sequence includes a second transition part sequence.

S201 and S202 in this embodiment are the same as S101 and S102 in the foregoing embodiment, and their implementation principles and technical effects are similar. For details, refer to the foregoing embodiment, which will not be repeated herein.

At S203, the second part sequence and the first part sequence are successively played according to a second preset instruction, wherein a playing of the first transition part sequence is located at the head of the playing of the first part sequence, and a playing of the second transition part sequence is located at a tail of the playing of the second part sequence, that is, when playing the first part sequence, the first transition part sequence in the first part sequence should be played last, and when playing the second part sequence, the second transition part sequence in the second part sequence should be played first.

In this embodiment, the second preset instruction is used to instruct the execution of the switching of the second expression to the first expression.

In response to that the first transition part sequence and the second transition part sequence only include one frame of part mappings for respective parts of the virtual characters face, when switching from the second expression to the first expression, the expressions are played in the following order: the second part sequence corresponding to the second expression→the second transition part sequence→the first transition part sequence→the first part sequence corresponding to the first expression.

Figure 8:
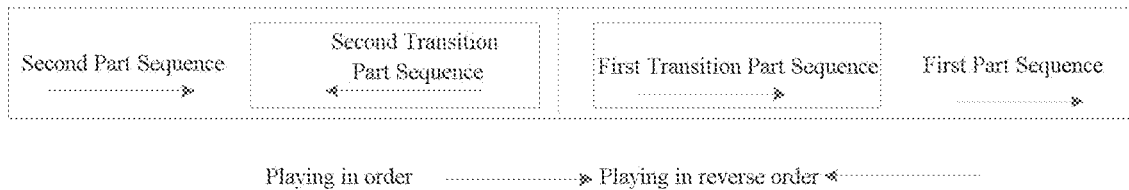
FIG. 8 is a schematic diagram of playing an expression switching provided by some embodiments of the present disclosure.

In response to that the first transition part sequence and the second transition part sequence include a plurality of frames of part mappings for respective parts of the virtual characters face, when switching from the second expression to the first expression, after the second part sequence is played, frames in the second transition part sequence is played in reverse order, and then the first transition part sequence and the first part sequence are played in order, as shown in FIG. 8.

The methods according to some embodiments of the present disclosure realize a natural transition between different expressions the virtual character and an improvement of the naturalness and fluency of the expression switching of the virtual character by the followings steps: acquiring sequence frames of respective parts of a face of the virtual character; acquiring a first part sequence corresponding to a first expression and a second part sequence corresponding to a second expression from the sequence frames of respective parts, wherein the first part sequence includes a first transition part sequence, and the second part sequence includes a second transition part sequence; and sequentially playing the second part sequence and the first part sequence according to a second preset instruction, and playing order of the first transition part sequence is located at the tail of the playing of the first part sequence, and playing order of the second transition part sequence is located at the head of the playing of the second part sequence.

On the basis of the foregoing embodiments, the method for realizing the expression of the virtual character provided by some embodiments involves preprocessing processes of part sequences and transition part sequences, and the natural transitions between different expressions are realized based on the preprocessed part sequences and transition part sequences.

Figure 9:
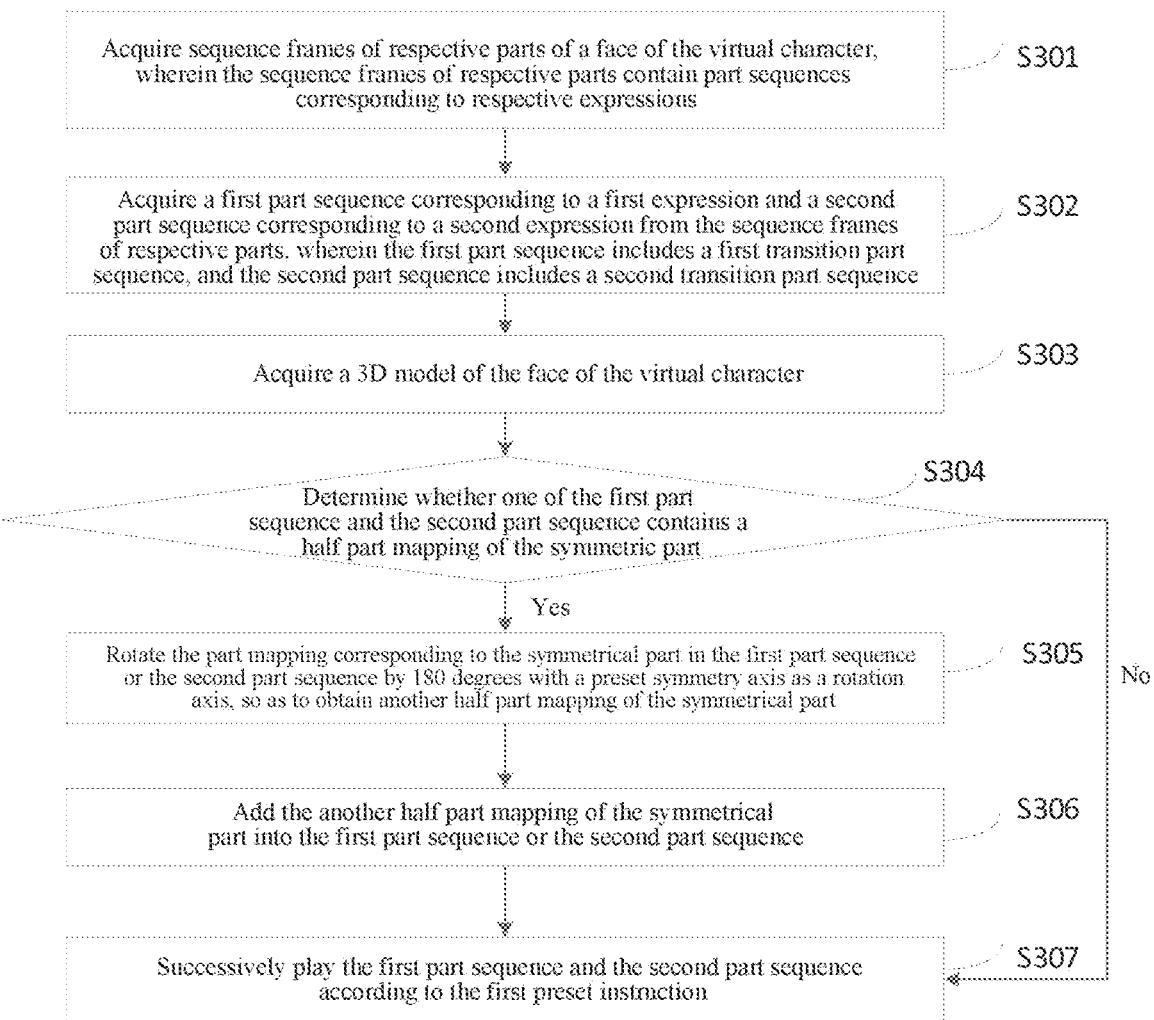
FIG. 9 is a schematic flowchart of a method for realizing an expression of a virtual character according to some embodiments of the present disclosure.

FIG. 9 is a schematic flowchart of a method for realizing an expression of a virtual character according to some embodiments of the present disclosure. As shown in FIG. 9, the method includes the following steps.

At S301, sequence frames of respective parts of a face of a virtual character are acquired, wherein the sequence frames of respective parts contain part sequences corresponding to respective expressions.

At S302, a first part sequence corresponding to a first expression and a second part sequence corresponding to a second expression are acquired from the sequence frames of respective parts, wherein the first part sequence includes a first transition part sequence, and the second part sequence includes a second transition part sequence.

At S303, a 3D model of the face of the virtual character is acquired.

At S304, it is determined whether one of the first part sequence and the second part sequence contains a half part mapping of a symmetric part.

In response to that the first part sequence or the second part sequence contains the half part mapping of the symmetrical part, S305 is executed. In response to that the first part sequence or the second part sequence does not contain the half part mapping of the symmetrical part, S307 is executed.

At S305, the part mapping corresponding to the symmetrical part in the first part sequence or the second part sequence is rotated by 180 degrees with a preset symmetry axis as a rotation axis, so as to obtain another half part mapping of the symmetrical part.

At S306, the another half part mapping of the symmetrical part is added into the first part sequence or the second part sequence.

At S307, the first part sequence and the second part sequence are successively played according to the first preset instruction, In this embodiment, respective parts of the face of the virtual character include one or more symmetric part and one or more asymmetric part. The sequence frames of respective parts of the virtual character's face include part mappings of respective parts under different expressions, and the part mappings are asymmetrical to each other. That is to say, the part mappings stored in the resource library are all asymmetrical part mappings. This storage method realizes multiple reuses of the mappings of respective parts, saves the number of mappings in the resource library to the greatest extent, and releases the memory space of the resource library.

Figure 10:
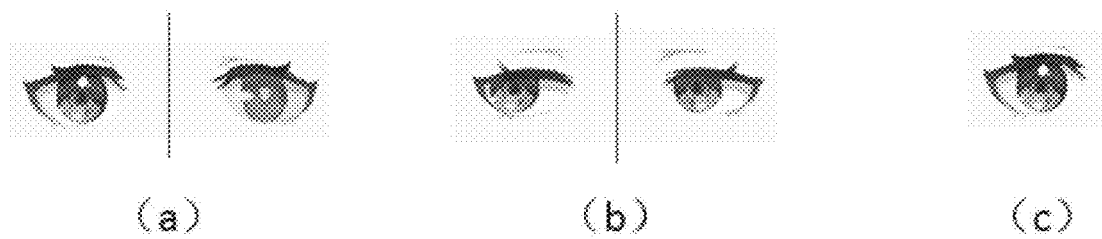
FIG. 10 is a schematic diagram of a mapping of an eye part of a virtual character provided by some embodiments of the present disclosure.

For example, for an eye part of a virtual character, the sequence frame of the eye part includes all the mappings of the eye part of the virtual character under different expressions, such as angry, mad, happy, shy, etc. It should be noted that since the eye part of the character appear in pairs, the mappings of a pair of eye parts may be axially symmetrical or not axially symmetrical in the central axis. FIG. 10 shows a group of axis-symmetrical mappings of the eye part (a) and a group of asymmetrical mappings of the eye part (b). It can be seen from the figures that whether the eye part is symmetric mainly depends on the direction of the eyeball's line of sight. If the line of sight of the virtual character looks to the left or right at the same time, the mappings of the eye part is asymmetrical in the central axis. If the line of sight of the virtual character is straight ahead, the mappings of the eye part is symmetrical in the central axis.

Similarly, for a mouth part of a virtual character, the sequence frame of the mouth part includes all the mappings of the mouth part of the virtual character under different expressions, such as angry, mad, happy, shy, etc. It should be noted that the mappings of the mouth part under different expressions may be symmetrical in the central axis, for example, the mouth with an open mouth smile expression, as shown in the mapping in FIG. 11(*a*), or may be asymmetrical in the central axis, for example, the mouth under the smiley face, as shown in the mapping in FIG. 11(*b*).

In this embodiment, by obtaining the part mappings of respective parts of the face drawn by the user, it is determined whether the part mapping is a central axis symmetrical mapping. If the part mapping is the central axis symmetrical mapping, the part mapping can be cut by using the central axis as a reference, and only half part mapping is kept and stored into the resource library. Since only half part mappings of the face of the virtual character under different expressions are stored in the resource library, a large amount of memory space is released compared with the prior art. The user can use the memory space released in the resource library to further expand the part mappings of the virtual character's face, and store part mappings drawn newly into the resource library, thus enriching the expression characteristics of the virtual character, and making the expression of the virtual character more vivid and more real.

Figure 11:
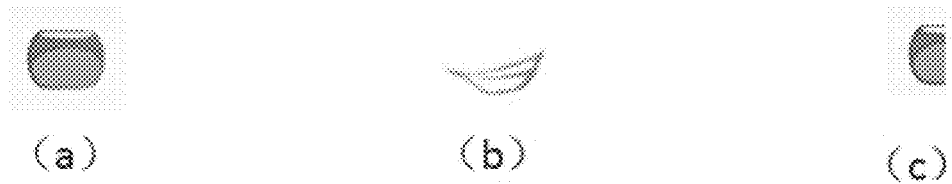
FIG. 11 is a schematic diagram of a mapping of a mouth part of a virtual character provided by some embodiments of the disclosure.

In some embodiments, for the mappings (a) of the eye part shown in FIG. 10, since the mappings (a) containing the left eye and the right eye is axially symmetric in the central axis, the mapping of one of the eyes can be deleted, and only the mapping of the other eye is kept in the resource library, as shown in FIG. 10 (*c*). For the mappings (a) of the mouth part shown in FIG. 11, since the mappings (a) of the mouth is axially symmetric in the central axis, the mapping of a half mouth can be cut, and only half mapping of the mouth is retained in the resource library, as shown in FIG. 11 (*c*).

Figure 12:
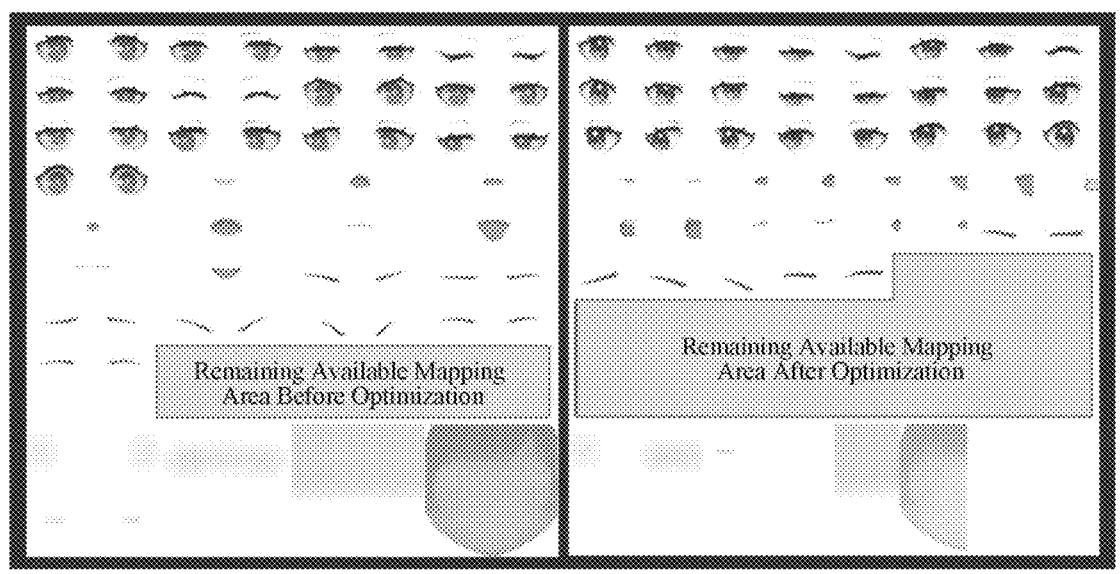
FIG. 12 is a schematic diagram of a comparison of mapping regions in a resource library before and after optimization provided by some embodiments of the disclosure.

Since the resource library in this embodiment only stores a half part mappings of the respective parts of the virtual character's face under different expressions, a part of the memory space is released, so that the part mappings of more expressions can be added into the limited memory space to enrich the expression animation of virtual characters. FIG. 12 shows a schematic diagram of the comparison of the mapping regions in the resource library before and after optimization. In the resource library according to the embodiments of the present disclosure, more expression mappings can be expanded to make the expression animation of the virtual character more vivid.

Based on the foregoing storage method for part mappings, in the method for realizing the expression of the virtual character provided by some embodiments, after obtaining the first part sequence corresponding to the first expression and the second part sequence corresponding to the second expression, it is necessary to determine whether the first part sequence or the second part sequence contains a half part mapping of the symmetric part. If it contains the half part mappings, then the half part mapping can be rotated 180 degrees with the preset symmetry axis as the rotation axis to obtain the another half part mapping. The original half part mapping and the newly generated another half part mapping are combined to obtain a complete mapping. Next, the first part sequence and the second part sequence are played in sequence according to the first preset instruction. Through the preprocessing process of the part mapping, the complete part mapping is obtained, thereby generating the part sequence and the transition part sequence corresponding to each expression to realize the natural transition of the expression.

On the basis of the foregoing embodiments, this embodiment also provides an expression realization method, which realizes a random effect under the standby expression by setting a random sequence of respective parts of the virtual character's face under a standby expression. Specifically, any expression of the virtual character can be set as the standby expression. The following embodiments describe the solution with the first expression being the standby expression of the virtual character.

Figure 13:
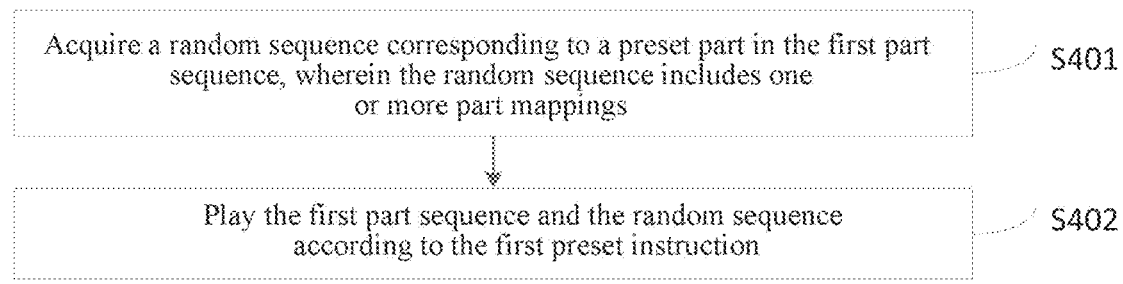
FIG. 13 is a schematic flowchart of a method for realizing an expression of a virtual character according to some embodiments of the present disclosure.
Figure 14:
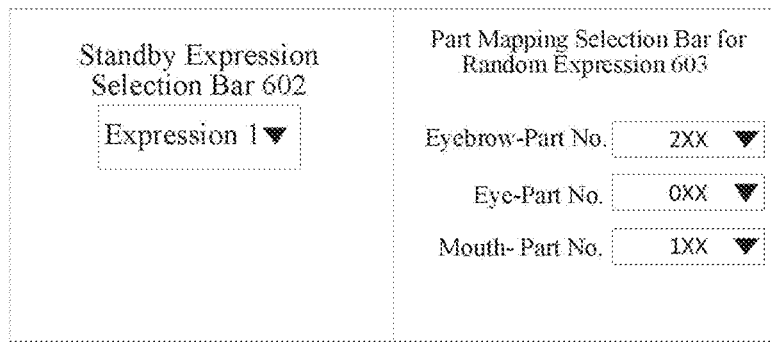
FIG. 14 is a schematic diagram of an expression setting interface provided by some embodiments of the present disclosure.

FIG. 13 is a schematic flowchart of a method for realizing an expression of a virtual character according to some embodiments of the present disclosure, and FIG. 14 is a schematic diagram of an expression setting interface provided by some embodiments of the present disclosure.

As shown in FIG. 13, the method provided in this embodiment includes the following steps.

At S401, a random sequence corresponding to a preset part in a first part sequence is acquired, wherein the random sequence includes one or more part mappings.

In this embodiment, the first part sequence is a part sequence corresponding to a first expression. The user sets a random sequence for the first expression (i.e., the illustrated expression 1) through the expression setting interface 601 shown in FIG. 14. The expression setting interface 601 includes a standby expression selection bar 602 and a part mapping selection bar 603, the part mapping selection bar 603 is used for the random sequence. The part mapping selection bar 603 for the random sequence includes a mapping selection control, which is used to control the selection of respective parts of the virtual character's face, such as a mapping selection control for eyebrows, a mapping selection control for eyes, and a mapping selection control for mouth. The user can select the part mappings of respective parts from the resource library through a pull-down menu, or draw a new part mapping.

For example, the user sets the standby expression of the virtual character through the standby expression selection bar 602, such as setting expression 1 as the standby expression. One or more part mappings on the face of the virtual character under the standby expression are set through the part mappings selection bar 603 for random sequence. The part mappings of respective parts constitute a random sequence. It should be noted that the number of part mappings of a certain part of the face in the random sequence can be one or more.

At S402, the first part sequence and the random sequence are played according to a first preset instruction.

In this embodiment, the first preset instruction is also used to instruct to execute the first part sequence corresponding to the first expression and the random sequence of the first expression. Specifically, the first part sequence is played according to the first preset instruction, and after the first part sequence is played, the first part sequence or the part mappings of respective parts in the random sequence are randomly played. Taking the eye part as an example, the first part sequence includes Standby Eye under the first expression, and the random sequence includes Random Eye 1, Random Eye 2, and Random Eye 3 under the first expression. After the Standby Eye is played, the device can randomly play one of Standby Eye. Random Eye 1, Random Eye 2, and Random Eye 3.

According to the method for realizing the expression of the virtual character provided by the embodiments of the present disclosure, the expression realization process includes a random process of the standby expression, which includes obtaining a first part sequence corresponding to a first expression and a random sequence corresponding to a preset part in the first part sequence, wherein the random sequence includes one or more part mappings; and playing the first part sequence and the random sequence according to the first preset instruction. The above method realizes the random effect of the standby expression, and improves the naturalness and fluency of the virtual character's expression.

Figure 15:
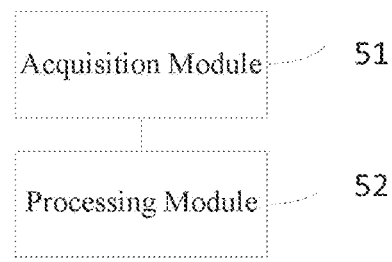
FIG. 15 is a schematic structural diagram of an apparatus for realizing an expression of a virtual character provided by some embodiments of the present disclosure.

FIG. 15 is a schematic structural diagram of an apparatus for realizing an expression of a virtual character provided by some embodiments of the present disclosure. As shown in FIG. 15, the apparatus for realizing the expression of the virtual character provided in this embodiment includes an acquisition module 51, and a processing module 52.

The acquisition module 51 is configured to execute the acquisition of sequence frames of respective parts of a face of the virtual character, wherein the sequence frames of respective parts contain part sequences corresponding to respective expressions;

The acquisition module 51 is further configured to acquire a first part sequence corresponding to a first expression and a second part sequence corresponding to a second expression from the sequence frames of respective parts, wherein the first part sequence includes a first transition part sequence, and the second part sequence includes a second transition part sequence;

The processing module 52 is configured to successively play the first part sequence and the second part sequence according to a first preset instruction, and a playing of the first transition part sequence is located at the tail of the playing of the first part sequence, and a playing of the second transition part sequence is located at the head of the playing of the second part sequence.

In some embodiments, the first transition part sequence is played in reverse order and the second transition part sequence is played in order.

In some embodiments, the processing module 52 is further configured to successively play the second part sequence and the first part sequence, in response to a second preset instruction, and a playing of the second transition part sequence is located at the tail of the playing of the second part sequence, and a playing of the first transition part sequence is located at the head of the playing of the first part sequence.

In some embodiments, when playing the second part sequence and the first part sequence successively in response to the second preset instruction, the second transition part sequence is played in reverse order and the first transition part sequence is played in order.

In some embodiments, the part sequences corresponding to respective expressions comprise part mappings, and the part mappings in the sequence frame are asymmetrical to each other.

In some embodiments, the respective parts of the face of the virtual character comprise one or more symmetrical part and one or more asymmetrical part.

Figure 16:
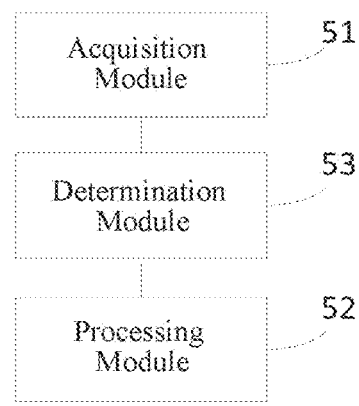
FIG. 16 is a schematic structural diagram of an apparatus for realizing an expression of a virtual character according to some embodiments of the present disclosure.

FIG. 16 is a schematic structural diagram of an apparatus for realizing an expression of a virtual character provided by some embodiments of the present disclosure. Based on the apparatus of FIG. 15, the apparatus shown in FIG. 6 further includes a determination module 53.

The acquisition module 51 is further configured to acquire a 3D model of the face of the virtual character.

The determination module 53 is configured to determine whether one of the first part sequence and the second part sequence contains a half part mapping of the symmetric part.

In response to that the first part sequence or the second part sequence contains the half part mapping of the symmetrical part, the processing module 52 is further configured to rotate the part mapping corresponding to the symmetrical part in the first part sequence or the second part sequence by 180 degrees with a preset symmetry axis as a rotation axis, so as to obtain another half part mapping of the symmetrical part; add the another half part mapping of the symmetrical part into the first part sequence or the second part sequence; and play the first part sequence and the second part sequence successively according to the first preset instruction.

In some embodiments, the acquisition module 51 is further configured to acquire a random sequence corresponding to a preset part in the first part sequence, wherein the random sequence includes one or more part mappings. The processing module 52 is further configured to play the first part sequence and the random sequence according to the first preset instruction.

In some embodiments, the respective parts of the face of the virtual character comprise a facial base map, eyebrows, eyes, nose, mouth, and an additional layer.

The apparatus for realizing the expression of the virtual character provided in this embodiment can execute the technical solutions of the foregoing method embodiments, and its implementation principles and technical effects of them are similar, and will not be repeated herein.

Figure 17:
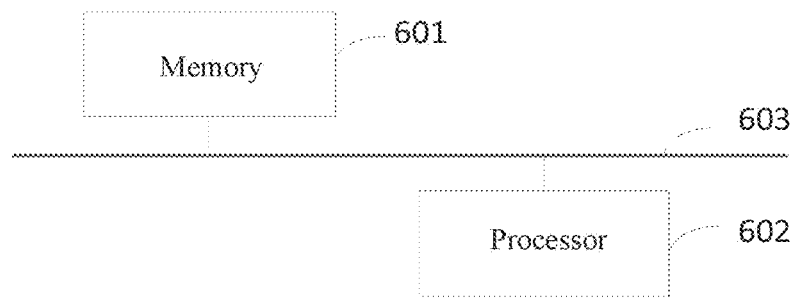
FIG. 17 is a hardware structure diagram of an apparatus for realizing an expression of a virtual character provided by some embodiments of the present disclosure.

FIG. 17 is a hardware structure diagram of an apparatus for realizing an expression of a virtual character provided by some embodiments of the present disclosure. As shown in FIG. 17, the apparatus for realizing the expression of the virtual character provided in this embodiment includes: memory 601; processor 602; and a computer program. The computer program is stored in the memory 601 and is configured to be executed by the processor 602 to implement the technical solution as in any of the foregoing method embodiments. The implementation principles and technical effects are similar and will not be repeated herein.

In some embodiments, the memory 601 may be independent or integrated with the processor 602.

When the memory 601 is a device independent of the processor 602, the apparatus for realizing the expression of the virtual character further includes a bus 603 for connecting the memory 601 and the processor 602.

Embodiments of the present disclosure also provide a computer-readable storage medium on which a computer program is stored, and the computer program is executed by the processor 602 to implement various steps performed by the apparatus for realizing the expression of the virtual character in the above method embodiment.

In the several embodiments provided in the present disclosure, it should be understood that the disclosed device and method may be implemented in other ways. For example, the device embodiments described above are merely illustrative. For example, the division of modules is only a logical function division. In actual implementation, there may be other division methods, for example, multiple modules may be combined or integrated into another system, or some features can be ignored or not implemented. In addition, the displayed or discussed mutual coupling or direct coupling or communication connection may be indirect coupling or communication connection through some interfaces, devices or modules, and may be in electrical, mechanical or other forms.

The modules described as separate components may or may not be physically separated, and the components displayed as modules may or may not be physical units, that is, they may be located in one place, or they may be distributed on multiple network units. Some or all of the modules may be selected according to actual needs to achieve the objectives of the solutions of the embodiments.

In addition, the functional modules in the various embodiments of the present disclosure may be integrated into one processing unit, or each module may exist alone physically, or two or more modules may be integrated into one unit. The units formed by the above-mentioned modules can be realized in the form of hardware, or in the form of hardware plus software functional units.

The above-mentioned integrated module implemented in the form of a software function module may be stored in a computer readable storage medium. The above-mentioned software function module is stored in a storage medium, and includes a number of instructions to make a computer device (such as a personal computer, a server, or a network device, etc.) or a processor execute the steps of the method of each embodiment of the present disclosure.

It should be understood that the foregoing processor may be a central processing unit (CPU), or other general-purpose processors, digital signal processors (DSP), Application Specific Integrated Circuit (ASIC), etc. The general-purpose processor may be a microprocessor or the processor may also be any conventional processor or the like. The steps of the method disclosed in combination with the invention can be directly embodied as executed by a hardware processor, or executed by a combination of hardware and software modules in the processor.

The memory may include a high-speed RAM memory, and may also include a non-volatile storage NVM, such as at least one disk storage, and may also be a U disk, a mobile hard disk, a read-only memory, a magnetic disk, or an optical disk, etc.

The bus may be an Industry Standard Architecture (ISA) bus, a Peripheral Component (PCI) bus, or an Extended Industry Standard Architecture (EISA) bus. The bus can be divided into address bus, data bus, control bus, etc. For ease of representation, the buses in the drawings of this disclosure are not limited to only one bus or one type of bus.

The above-mentioned storage medium may be implemented by any type of volatile or non-volatile storage device or a combination thereof, such as static random access memory (SRAM), electrically erasable programmable read-only memory (EEPROM), erasable programmable read only memory (EPROM), programmable read only memory (PROM), read only memory (ROM), magnetic memory, flash memory, magnetic disk or optical disk. The storage medium may be any available medium that can be accessed by a general-purpose or special-purpose computer.

An exemplary storage medium is coupled to the processor, so that the processor can read information from the storage medium and can write information to the storage medium. Of course, the storage medium may also be an integral part of the processor. The processor and the storage medium may be located in Application Specific Integrated Circuits (ASIC). Of course, the processor and the storage medium may also exist as discrete components in the electronic device or the main control device.

Finally, it should be noted that the above embodiments are only used to illustrate the technical solutions of the present disclosure and not to limit. Although the present disclosure has been described in detail with reference to the foregoing embodiments, those of ordinary skill in the art should understood that it is still possible to modify the technical solutions described in the foregoing embodiments, or equivalently replace some or all of the technical features; these modifications or replacements do not make the essence of the corresponding technical solutions deviate from the scope of the technical solution according to the embodiments of the present disclosure.

What is claimed is:

1. A method for realizing an expression of a virtual character, comprising:
   acquiring sequence frames of respective parts of a face of the virtual character, wherein the sequence frames of respective parts contain part sequences corresponding to respective expressions;
   acquiring a first part sequence corresponding to a first expression and a second part sequence corresponding to a second expression from the sequence frames of respective parts, wherein the first part sequence comprises a first transition part sequence, and the second part sequence comprises a second transition part sequence; and
   successively playing the first part sequence and the second part sequence according to a first preset instruction, wherein a playing of the first transition part sequence is located at a tail of the playing of the first part sequence, and a playing of the second transition part sequence is located at a head of the playing of the second part sequence.

2. The method according to claim 1, wherein the first transition part sequence is played in reverse order and the second transition part sequence is played in order.

3. The method according to claim 1, further comprising:
   in response to a second preset instruction, successively playing the second part sequence and the first part sequence, wherein the playing of the second transition part sequence is located at a tail of the playing of the second part sequence, and the playing of the first transition part sequence is located at a head of the playing of the first part sequence.

4. The method according to claim 3, wherein when successively playing the second part sequence and the first part sequence in response to the second preset instruction, the second transition part sequence is played in reverse order and the first transition part sequence is played in order.

5. The method according to claim 1, wherein the part sequences corresponding to respective expressions comprise part mappings, wherein the part mappings in the sequence frames are asymmetrical to each other.

6. The method according to claim 5, wherein the respective parts of the face of the virtual character comprise at least one symmetrical part and at least one asymmetrical part;
   wherein the successively playing the first part sequence and the second part sequence according to the first preset instruction comprises:
      acquiring a 3D model of the face of the virtual character;
      determining whether one of the first part sequence and the second part sequence contains a half part mapping of the symmetric part;
      in response to that the first part sequence or the second part sequence contains the half part mapping of the symmetrical part, rotating the part mapping corresponding to the symmetrical part in the first part sequence or the second part sequence by 180 degrees with a preset symmetry axis as a rotation axis, so as to obtain another half part mapping of the symmetrical part;
      adding the another half part mapping of the symmetrical part into the first part sequence or the second part sequence; and
      successively playing the first part sequence and the second part sequence according to the first preset instruction.

7. The method according to claim 5, wherein the respective parts of the face of the virtual character comprise at least one symmetrical part and at least one asymmetrical part;
   wherein the successively playing the first part sequence and the second part sequence according to the first preset instruction comprises:
      acquiring a 3D model of the face of the virtual character;
      determining whether one of the first part sequence and the second part sequence contains a half part mapping of the symmetric part;
      in response to that the first part sequence or the second part sequence contains the half part mapping of the symmetrical part, generating another half part mapping of the symmetrical part which is axially symmetric to the half part mapping of the symmetrical part with respect to a preset symmetry axis;
      adding the another half part mapping of the symmetrical part into the first part sequence or the second part sequence; and
      playing the first part sequence and the second part sequence successively according to the first preset instruction.

8. The method according to claim 1, wherein the playing the first part sequence according to the first preset instruction comprises:
   acquiring a random sequence corresponding to a preset part in the first part sequence, wherein the random sequence includes one or more part mappings; and
   playing the first part sequence and the random sequence according to the first preset instruction.

9. The method according to claim 1, wherein the respective parts of the face of the virtual character comprise a facial base map, eyebrows, eyes, a nose, a mouth, and an additional layer.

10. A device for realizing an expression of a virtual character, comprising:
    a memory;
    a processor; and
    a computer program;
    wherein when the computer program is stored in the memory, and is executed by the processor to implement a method for realizing an expression of a virtual character,
    the processor is configured to,
       acquire sequence frames of respective parts of a face of the virtual character, wherein the sequence frames of respective parts contain part sequences corresponding to respective expressions;
       acquire a first part sequence corresponding to a first expression and a second part sequence corresponding to a second expression from the sequence frames of respective parts, wherein the first part sequence comprises a first transition part sequence, and the second part sequence comprises a second transition part sequence; and
       successively play the first part sequence and the second part sequence according to a first preset instruction, wherein a playing of the first transition part sequence is located at a tail of the playing of the first part sequence, and a playing of the second transition part sequence is located at a head of the playing of the second part sequence.

11. The device according to claim 10, wherein the first transition part sequence is played in reverse order and the second transition part sequence is played in order.

12. The device according to claim 10, wherein the processor is further configured to:
in response to a second preset instruction, successively play the second part sequence and the first part sequence, wherein the playing of the second transition part sequence is located at a tail of the playing of the second part sequence, and the playing of the first transition part sequence is located at a head of the playing of the first part sequence.

13. The device according to claim 12, wherein the processor is further configured to:
play the second transition part sequence in reverse order and play the first transition part sequence in order, when successively playing the second part sequence and the first part sequence in response to the second preset instruction.

14. The device according to claim 10, wherein the part sequences corresponding to respective expressions comprise part mappings, wherein the part mappings in the sequence frames are asymmetrical to each other.

15. The device according to claim 14, wherein the respective parts of the face of the virtual character comprise at least one symmetrical part and at least one asymmetrical part;
wherein the successively playing the first part sequence and the second part sequence according to the first preset instruction comprises:
acquiring a 3D model of the face of the virtual character;
determining whether one of the first part sequence and the second part sequence contains a half part mapping of the symmetric part;
in response to that the first part sequence or the second part sequence contains the half part mapping of the symmetrical part, rotating the part mapping corresponding to the symmetrical part in the first part sequence or the second part sequence by 180 degrees with a preset symmetry axis as a rotation axis, so as to obtain another half part mapping of the symmetrical part;
adding the another half part mapping of the symmetrical part into the first part sequence or the second part sequence; and
successively playing the first part sequence and the second part sequence according to the first preset instruction.

16. The device according to claim 14, wherein the respective parts of the face of the virtual character comprise at least one symmetrical part and at least one asymmetrical part;
wherein the successively playing the first part sequence and the second part sequence according to the first preset instruction comprises:
acquiring a 3D model of the face of the virtual character;
determining whether one of the first part sequence and the second part sequence contains a half part mapping of the symmetric part;
in response to that the first part sequence or the second part sequence contains the half part mapping of the symmetrical part, generating another half part mapping of the symmetrical part which is axially symmetric to the half part mapping of the symmetrical part with respect to a preset symmetry axis;
adding the another half part mapping of the symmetrical part into the first part sequence or the second part sequence; and
playing the first part sequence and the second part sequence successively according to the first preset instruction.

17. The device according to claim 10, wherein the processor is configured to:
acquire a random sequence corresponding to a preset part in the first part sequence, wherein the random sequence includes one or more part mappings; and
play the first part sequence and the random sequence according to the first preset instruction.

18. The device according to claim 10, wherein the respective parts of the face of the virtual character comprise a facial base map, eyebrows, eyes, a nose, a mouth, and an additional layer.

19. A non-transitory computer-readable storage medium having a computer instruction stored thereon, when the computer instruction being executed by a processor to implement a method for realizing an expression of a virtual character,
the method for realizing the expression of the virtual character comprising,
acquiring sequence frames of respective parts of a face of the virtual character, wherein the sequence frames of respective parts contain part sequences corresponding to respective expressions;
acquiring a first part sequence corresponding to a first expression and a second part sequence corresponding to a second expression from the sequence frames of respective parts, wherein the first part sequence comprises a first transition part sequence, and the second part sequence comprises a second transition part sequence; and
successively playing the first part sequence and the second part sequence according to a first preset instruction, wherein a playing of the first transition part sequence is located at a tail of the playing of the first part sequence, and a playing of the second transition part sequence is located at a head of the playing of the second part sequence.

* * * * *